UNITED STATES PATENT OFFICE.

FREDERICK J. PIEPER, OF SALT LAKE CITY, UTAH.

HAIR-TONIC.

No. 879,191.     Specification of Letters Patent.     Patented Feb. 18, 1908.

Application filed October 19, 1907. Serial No. 398,176.

*To all whom it may concern:*

Be it known that I, FREDERICK J. PIEPER, a citizen of the United States, residing at Salt Lake City, in the county of Salt Lake and State of Utah, have invented certain new and useful Improvements in Hair-Tonics, of which the following is a specification.

The present invention consists of a particularly effective mixture or compound for promoting or stimulating the growth of the hair.

One of the basic ingredients used in the practical embodiment of the invention is colocynth or bitter apple which acts peculiarly on the papillæ and root of the hair, promoting the formative growth of the pigmentary and forming cells, stimulating the minute vessels that come into contact with the bulb, and regulating the functions of the sebacious glands.

Below are indicated the preferred proportions of all the ingredients employed in the compounding of the mixture comprising the hair tonic or grower constituting this invention: tincture prepared from two ounces of colocynth; quinine sulfate, 90 grains; resorcinal, 1 ounce; washed sulfur, 1 dram; tincture of cantharides 7 fluid ounces; tincture of nux-vomica, 6 fluid ounces; salicylic acid, 30 grains; acetic acid, 1/2 ounce; glycerin, 2 drams; chloroform, 1 ounce; alcohol, 49 fluid ounces; and sufficient distilled water to make one gallon of the mixture. For perfuming the above mixture I utilize the following ingredients: alcohol, 2 ounces; vanillin, 20 grains; oil rose geranium, 30 minims; oil bitter almonds, 6 minims; oil neroli bigarade (*citrus aurantium*) 10 minims; and extract heliotrope, 1/2 ounce. It will be understood that the exact proportions of the foregoing ingredients may be modified within the contemplation of the invention in order to increase the effectiveness of the tonic which is not only a hair dressing but is an excellent remedy for cure of dandruff and falling hair.

It will be noted above that the mixture described contains especially effective proportions of the best known agents, cantharides, nux-vomica, etc., for causing a proper amount of blood supply to the lethargic papillæ, and possesses the most specific antiseptic and germicidal properties.

In compounding the mixture I macerate two ounces of powdered colocynth in a pint of diluted alcohol for four days, shaking occasionally. When macerated the supernatant liquid is decanted and the remainder transferred to a percolator, and when percolation is completed, the percolate is mixed with the decanted liquid and to this is added seven ounces of tincture of cantharides and six ounces of tincture of nux vomica. One dram of washed sulfur is now dissolved in one ounce of chloroform and added to the foregoing. The next step is to dissolve with the aid of heat 90 grains of quinine sulfate in one pint of alcohol and add to the mixture, and finally add 1/2 ounce acetic acid, 2 fluid drams of glycerin, 30 grains salicylic acid, one ounce resorcinal, the remainder of the alcohol, the distilled water and the perfume, let it stand in a cool place for two days, and filter with calcium phosphate at a low temperature.

Having thus described the invention, what is claimed as new is:—

1. A hair tonic including tincture of colocynth, quinine sulfate, resorcinal, sulfur, tincture of cantharides, tincture of nux-vomica, salicylic acid, acetic acid, glycerin, chloroform, alcohol, water, and a perfume, substantially in the proportions specified.

2. A hair tonic including tincture of colocynth, quinine sulfate, resorcinal, sulfur, tincture of cantharides, tincture of nux-vomica, salicylic acid, acetic acid, glycerin, chloroform, alcohol, water, and a perfume including vanillin, oil rose geranium, oil bitter almonds, oil bigarade, and extract heliotrope, substantially in the proportions specified.

In testimony whereof I affix my signature in presence of two witnesses.

FREDERICK J. PIEPER.

Witnesses:
    JAMES E. MCDONALD,
    E. M. PIEPER.